United States Patent [19]

Laing et al.

[11] 4,437,484
[45] Mar. 20, 1984

[54] UTILITY WATER SYSTEM WITH A PRESSURELESS STORAGE CONTAINER, PARTICULARLY FOR SOLAR INSTALLATIONS

[76] Inventors: Karsten Laing, Kaiserallee 51, 7500 Karlsruhe; Oliver Laing, Weissdornweg 14, 7400 Tubingen; Nikolaus Laing, Hofener Weg 35-37, 7148 Remseck 2, all of Fed. Rep. of Germany; Ludwig Ludin, Kesselackerweg, 5611 Anglikon, Switzerland

[21] Appl. No.: 358,883

[22] Filed: Mar. 16, 1982

[30] Foreign Application Priority Data

Mar. 16, 1981 [CH] Switzerland ............ 1755/81

[51] Int. Cl.³ .............................................. F04B 17/00
[52] U.S. Cl. ........................................ 137/99; 137/565; 417/323; 417/404; 126/362
[58] Field of Search .................... 137/99, 334, 565; 251/65; 417/323, 376, 404; 126/362

[56] References Cited

U.S. PATENT DOCUMENTS

| 623,229 | 4/1899 | Weiss | 417/376 |
|---|---|---|---|
| 646,061 | 3/1900 | Weiss | 417/376 |
| 646,062 | 3/1900 | Weiss | 417/376 |
| 2,203,832 | 6/1940 | Malburg | 137/99 |
| 2,756,739 | 7/1956 | Schaub | 126/362 |
| 2,932,257 | 4/1960 | Lupin | 417/323 |
| 3,053,842 | 9/1962 | Meissner | 137/99 |
| 3,282,468 | 11/1966 | Karlen | 137/565 |
| 3,490,378 | 1/1970 | Vossen | 137/565 |
| 4,203,571 | 5/1980 | Ruscher | 251/65 |
| 4,350,022 | 9/1982 | Kristapovich et al. | 417/404 |

Primary Examiner—Alan Cohan
Assistant Examiner—John A. Rivell
Attorney, Agent, or Firm—Pennie & Edmonds

[57] ABSTRACT

A warm water storage system for supplying warm water to a network with water under pressure characterized in that the storage is pressureless and takes place in a ventilated container, and that between the take-off region of the container and the warm water supply network is incorporated a booster pump.

5 Claims, 6 Drawing Figures

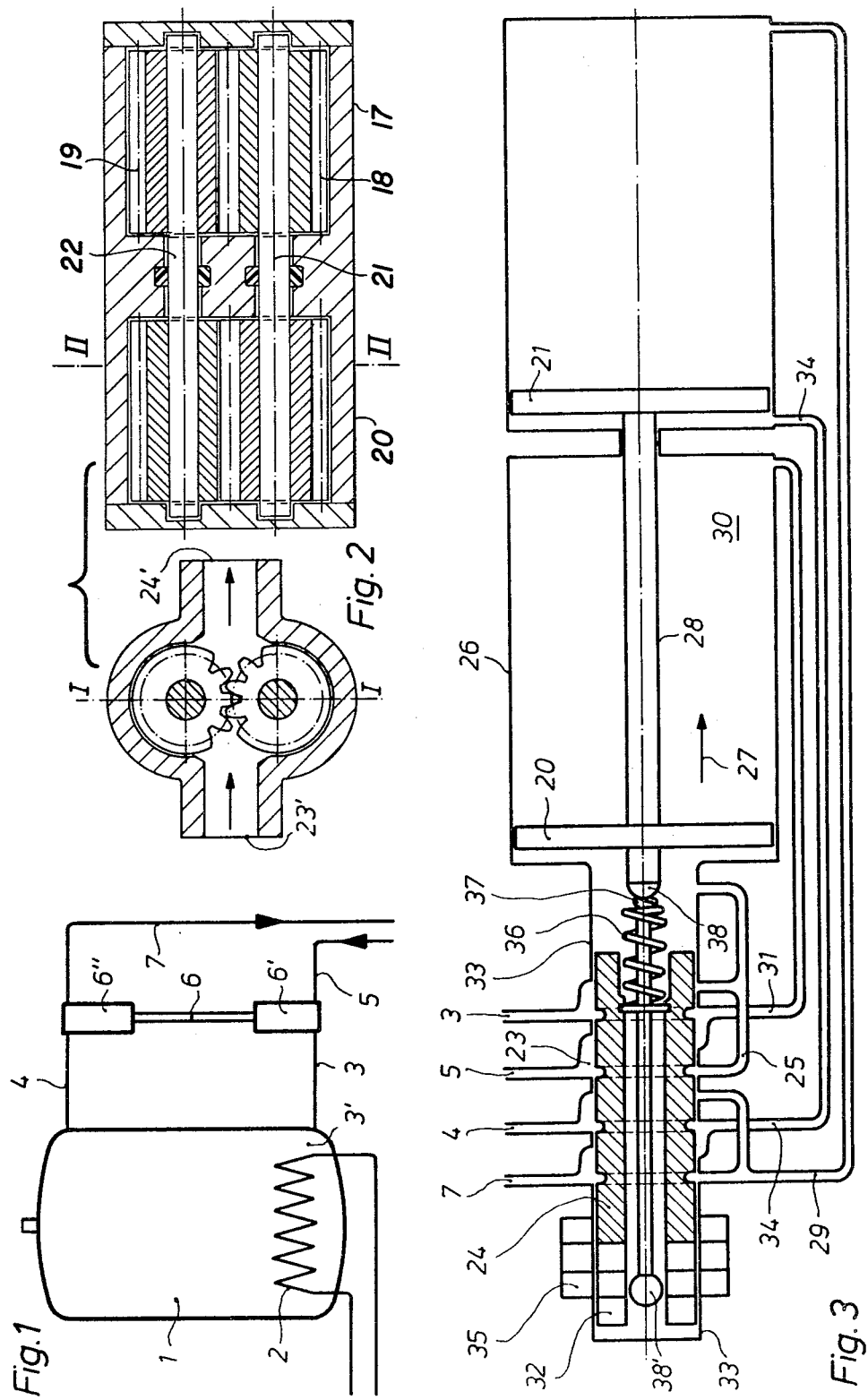

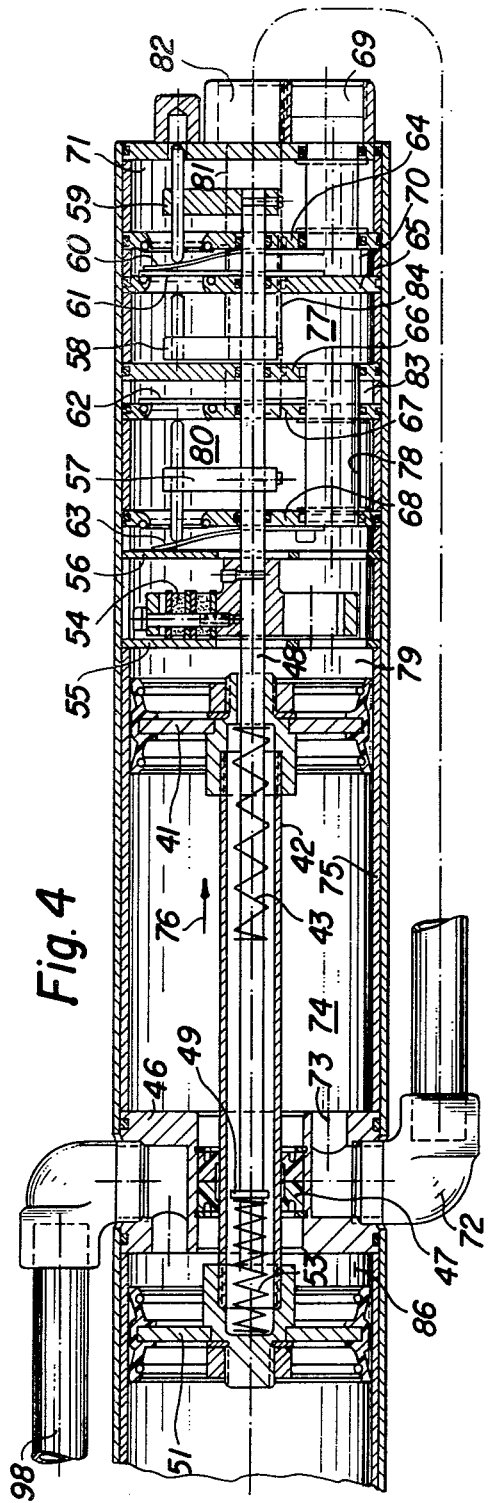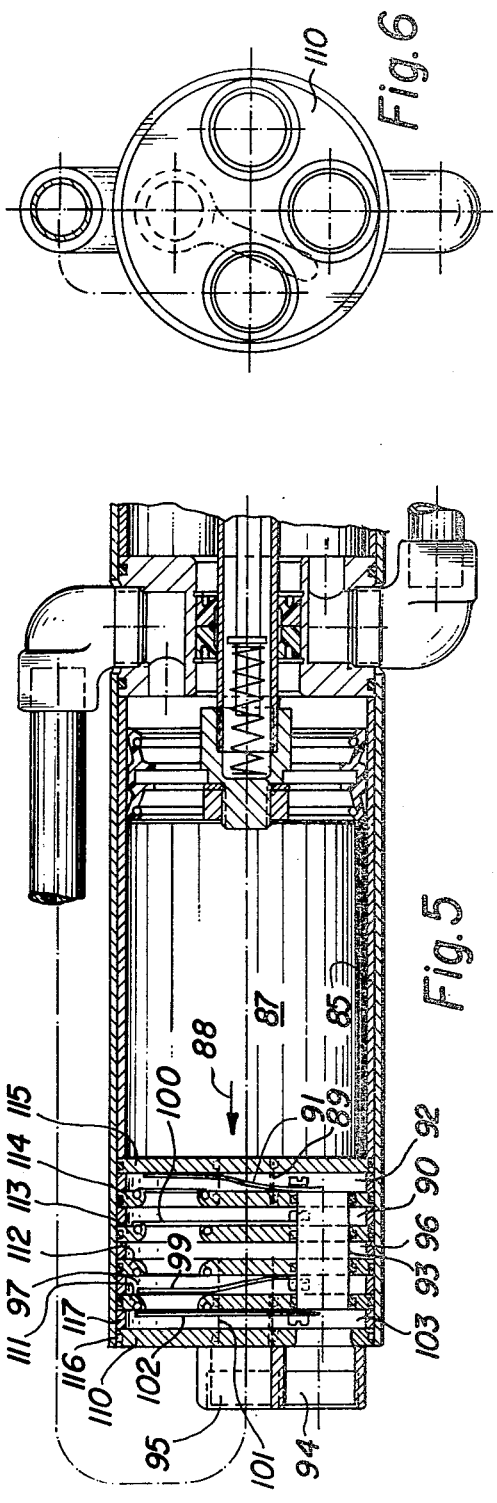

UTILITY WATER SYSTEM WITH A PRESSURELESS STORAGE CONTAINER, PARTICULARLY FOR SOLAR INSTALLATIONS

The invention relates to warm water supply installations with low-pressure storage means.

It is known that pressure containers which are under network pressure may be used as warm water storage means for utility water in connection with solar collectors. Because such pressure containers must be designed for the high system pressures which may occur in the water supply network and are therefore subject to costs-increasing testing regulations, the storage containers cost much more than all other elements of solar installations. Because, however, the usable quantity of heat obtained by solar heating systems during a year, is largely determined by the volume of the storage means and consequently storage means which is as large as possible is desirable, solar installations of conventional design with a pressure container cannot be economically made due to the high investment costs.

Also known are very cheap containers which are not subject to pressure which are made as inflatable containers, e.g. of polyethylene. However, these containers must be situated above bleeding points and due to non-existence of excess pressure cannot be integrated in warm water systems designed for network pressure.

The aim of the invention is to make use of the advantages of storing in low pressure containers and to combine these with the advantages of a warm water circuit operating at network pressure. This is achieved according to the invention in that a booster pump is situated downstream of the low pressure container which raises the warm water flow needed on the consumption side to the necessary working pressure. This may be simply obtained by a booster pump driven by an electric motor in connection with a press switch, installed in the warm water circuit, so that the working pressure is given only to that amount of water which is actually needed. Due to the relatively high pressures and relatively small amounts positive displacement pumps, e.g. gear pumps, proved to be particularly advantageous. The disadvantage of this solution lies in that it requires installation of an electric connection for the motor of the pump.

Therefore a further embodiment of the invention provides a drive by cold water which is under pressure, while, according to the invention, a predetermined volume of cold water from the network transmits its pressure onto an equally large volume of warm water from the storage container and pumps it into the warm water circuit. The principle is suitable for the heating by solar installations, heat pumps, electrical resistance heating or even by a boiler.

Typical embodiments will be described with reference to Figures.

FIG. 1 shows a pinciple diagram.

FIG. 2 shows a unit comprising a gear motor and a gear pump.

FIG. 3 shows a pressure transmitting means with two pistons.

FIGS. 4 to 6 show structural embodiment of a pressure transmitting means with a piston.

FIG. 1 shows a principle diagram with a storage container in which is situated a heat transmitting means 2 for heating water. At the lowest point is situated a cold water supply 3 and at the highest point a warm water pipe 4 leaves the storage container 1. Water under pressure is supplied by the pipe 5 to the motor part 6' of the pressure transmitting means 6; hot water under pressure flows through the pipe 7 into the warm water circuit. The pressure transmitting means 6 is composed of two displacement machines 6' and 6", connected mechanically to each other. The part 6' acts as a motor, driven by the cold water. The part 6" acts as a pump which pumps the same amount of hot water into the warm water circuit.

FIG. 2 shows a longitudinal section and a cross-section through a pressure transmitting means, the right-hand side 17 of which forms a gear pump which contains gears 18 and 19, and the left-hand side 20 of which acts as a hydraulic gear motor. The torque is transmitted by the shafts 21 and 22 from the motor 20 to the gear pump 17. By the port 23' in the region 20 enters cold water and arrives through a port 24' pressureless through the pipe 3 into the storage container 1. Next to the port 23' is provided in the pump region 17 a further port which communicates with the pipe 4, while next to the port 24' is provided in the region 17 a port which communicates with the pipe 7 through which flows warm water under pressure into the warm water circuit. The right-hand side representation corresponds to the section line I—I, the left-hand side representation to the section line II—II. As material proved to be particularly suitable tetrafluoroethylene because it is not prone to furring.

FIG. 3 shows a principle diagram with reciprocating pistons 20 and 21. Water under pressure enters through the pipe 5 into the reversing valve 33, 24 and flows via the groove 23 in the valve spool 24 to the pipe 25 and from there into the cylinder 26. The piston 20 is thereby moved in the direction of the arrow 27. The piston 21 in the right-hand water region 26' of the cylinder 26 is moved by the piston rod 28 also in the direction of the arrow 27. During this movement the piston 21 sucks in, via the pipe 34, hot water from the pipe 4 and simultaneously forces out, via the pipe 29, the hot water, sucked in in the previous stroke, through the pipe 7. The cold water filling 30 arrives by the pipe 31 into the pipe 3 and from there to the lower region 3' of the storage container 1. The spool 24 of the valve which is made of non-furring material, e.g. PTFE, forms a unit with a magnetic region composed of one or more permanently magnetic rings 32.

These rings are axially magnetised and so arranged relative to each other that always the same polarities are in contact with each other. The valve housing 33 serves to guide the spool 24 and carries a second ground of magnet rings 35 which surround the valve housing 33 and have the same axial dimension as the magnet rings 32. At the end of the spool 24/32 is arranged a helical coil 36 the last turn 37 of which is so narrow that the stops 38, 38' carry with them the helical spring by positive engagement. As soon as the pistons 20, 21 approach the dead centre remote from the valve, the stop 38' stresses the spring 36 to such an extent that the magnetic force of the magnets 32, 35 is overcome whereby the valves spool 24, 32 jumps into the second bistable position. Now the pipe 31 communicates with the pipe 5 for water under pressure and the pistons 20, 21 move in the opposite direction. Also the connections of the pipes 34 and 29 are changed so that now the pipe 29 communicates with the pipe 4 and the pipe 34 with the pipe 7. When the pistons 20, 21 approach the initial position, the spring 36 is compressed by the stop 38 until again the force of the magnets 32, 35 is overcome and the valve spool 24, 32 jumps back into the initial position. At this point the cycle begins again.

FIG. 4 shows the motor region of a structurally advantageous embodiment of the pressure transmitting device, FIG. 5 shows the central region of the pump part and FIG. 6 is a cross-section. The three Figures will now be described together.

The pistons 41 and 51 are interconnected by a tubular piston rod 42. The piston rod passes through the partition 46 in which are situated the sealing elements 47. Inside the piston rod is longitudinally displaceably arranged a reversing rod 48. The reversing rod has a carrier ring 49 which cooperates with helical springs 43 and 53. The reversing rod is mounted to be bistable by means of a permanent magnet 54, because the latter is in contact with an iron plate 55 or an iron plate 56. Leaf spring valves 60, 61, 62 and 63 are actuated by arms 57, 58 and 59. The valve seats are formed by plates 64, 65, 66, 67 and 68. By an inlet port 69 enters water under pressure into the space 70 and flows, in the illustrated position of the valve 60, into the space 71. This space communicates, via the transfer pipe 72 and the aperture 73, with the inner region 74 of the motor cylinder 75 at the partition and displaces the piston 41 in the direction of the arrow 76. As soon as the spring 53 reaches a pre-tension which is higher than the attractive force of the magnet 54, the reversing rod 48 jumps to the opposite position. Now the arm 58 opens the valve 61, the water under pressure flows through the space 77 and the tube 78 to the region 79 of the motor cylinder 75 at the valve. Now the pistons 41 and 51 move in the opposite direction. While previously the filling in the space 79 was pressed via the valve 63 into the space 80, which communicates via the tube 81 with the outlet port 82 on the side of cold water, now the valve 62 connects the space 80 with the space 83 which communicates via the pipe 84 with the space 71 and through this with the transfer pipe 72 via the aperture 73 with the cylinder region 74. The same basic arrangement is also in the pump region, however there the valves are not force-controlled. The pump cylinder 85 is also divided into spaces 86 and 87. If the piston 51 moves in the direction of the arrow 88, water enlosed in the space 87 flows through the pipe 89 to the space 90, opens the valve 91 and arrives through the space 92 and the pipe 93 into the outlet port 94. The inlet port 95 communicates with the space 96, while the space 97 communicates, via the transfer pipe 98, with the space 86. By the vacuum which is there formed the valve 99 opens and the water which was sucked in enters, via the space 97, into the space 86. As soon as the direction of movement of the piston 51 is reversed, the valve 91 closes and simultaneously the valve 100 opens, so that there is a flow from the inlet port 95 via the pipe 101, the space 96, the space 90 and the pipe 89 into the cylindrical space 87. During this direction of movement an excess pressure builds in the cylindrical space 86. Consequentially the valve 99 closes and via the space 97 hot water flows through the valve 102 into the space 103 and from there to the outlet port 94.

The valve region both at the motor and at the pump is formed by discs 110 with three ports, 111 with a valve seat and three pipe apertures, 112 with a valve seat and two pipe apertures, 113 with a valve seat and one pipe aperture, 114 with a valve seat and two pipe apertures, and 115 with only one pipe aperture. These discs contain grooves 116 in which are inserted O-rings. They are held spaced apart by cylindrical rings 117 and the cylindrical sleeve 85.

In order to avoid a pulsating flow the pressure port 94 is situated downstream of a membrane container, the membrane of which is on one side in contact with the hot water under pressure and on the other side encloses, together with a metal sheet cap, a gas filled space. The whole arrangement is preferably insulated to avoid heat losses and formation of condensation water.

We claim:

1. A warm water storage system for supplying warm water under pressure to a network including a warm water storage tank where the pressure above the water level in the tank is equal to ambient pressure, a pressurized cold water supply connecting with a cold water region of the tank, and a warm water takeoff region of the tank connecting with said network, characterized in having a warm water booster pump positioned between said warm water takeoff region and said network, and in having a positive displacement cold water motor connected to said booster pump and positioned between the cold water supply and the cold water region such that the pressure of said cold water supply will drive the motor to in turn drive the booster pump such that pressure in the cold water supply is transferred to said network.

2. A warm water storage system according to claim 1 wherein said pump has pump impellers and said motor has motor impellers with all of said impellers being positioned in a common housing.

3. A warm water storage system according to claim 1 wherein said pump has two cylinders, a piston reciprocally movable in each cylinder with the piston of one cylinder being connected by a common piston rod to the piston of the other cylinder and where one piston is contacted by the pressurized cold water supply and the other piston by warm water from said warm water takeoff region.

4. A warm water storage system according to claim 3 further characterized in having a reversing means adapted to be actuated by a pair of pistons whereby cold water from the pressurized cold water supply acts alternately on two sides of a piston.

5. A warm water storage system according to claim 4 further characterized in that said reversing means includes a valve piston and a magnet together forming a unit and a further magnet connected to a housing for the pump for moving the unit including the valve piston to a bi-stable position.

* * * * *